US012617088B2

(12) United States Patent
    Kim et al.

(10) Patent No.: US 12,617,088 B2
(45) Date of Patent: May 5, 2026

(54) ROBOT AND CONTROL METHOD THEREFOR

(71) Applicant: SAMSUNG ELECTRONICS CO., LTD., Suwon-si (KR)

(72) Inventors: Dohoon Kim, Suwon-si (KR); Hyunki Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 18/410,563

(22) Filed: Jan. 11, 2024

(65) Prior Publication Data

US 2024/0139947 A1 May 2, 2024

Related U.S. Application Data

(63) Continuation of application No. PCT/KR2022/010870, filed on Jul. 25, 2022.

(30) Foreign Application Priority Data

Sep. 9, 2021 (KR) ........................ 10-2021-0120397

(51) Int. Cl.
    *B25J 9/16* (2006.01)
    *B25J 9/00* (2006.01)
(52) U.S. Cl.
    CPC ........... *B25J 9/1664* (2013.01); *B25J 9/0084* (2013.01)
(58) Field of Classification Search
    CPC ....... B25J 9/1664; B25J 9/0084; G05D 1/644; G05D 1/693; G05D 1/2469; G05D 2107/60; G05D 2109/10
    See application file for complete search history.

(56) References Cited

U.S. PATENT DOCUMENTS

| | | | | |
|---|---|---|---|---|
| 8,160,762 B2* | 4/2012 | Moriguchi | ............ | B60B 19/003 |
| | | | | 701/29.2 |
| 8,271,132 B2* | 9/2012 | Nielsen | ................ | G05D 1/0044 |
| | | | | 700/250 |

(Continued)

FOREIGN PATENT DOCUMENTS

| | | |
|---|---|---|
| JP | 2019-84641 A | 6/2019 |
| JP | 6948632 B2 | 10/2021 |

(Continued)

OTHER PUBLICATIONS

Communication issued on Feb. 13, 2025 by the European Patent Office in European Patent Application No. 22867553.4.

(Continued)

*Primary Examiner* — Dalena Tran
(74) *Attorney, Agent, or Firm* — Sughrue Mion, PLLC

(57) ABSTRACT

A robot includes: at least one sensor; a driver configured to move the robot; a memory configured to store at least one instruction; and a processor configured to execute the at least one instruction to: identify sub spaces of a traveling space of the robot, obtain navigability information corresponding to the respective sub spaces based on sensing data obtained by the at least one sensor while the robot is traveling, obtain time information on time required for passing through the respective sub spaces based on a traveling map, the traveling map being obtained based on the navigability information, identify a moving path of the robot based on the time information, and control the driver based on the moving path, wherein the navigability information includes at least one of region information associated with a sub space, information associated with at least one other robot, and information associated with a dynamic object.

13 Claims, 11 Drawing Sheets

600

☒ one-way region ～610
▨ two-way region ～620
☐ obstacles ～630
☐ open region ～640
— peak line ～650

(56) References Cited

U.S. PATENT DOCUMENTS

| | | | | |
|---|---|---|---|---|
| 8,676,429 | B2 * | 3/2014 | Nakano | G05D 1/0274 |
| | | | | 701/25 |
| 9,020,682 | B2 | 4/2015 | Shitamoto et al. | |
| 9,829,333 | B1 | 11/2017 | Calder | |
| 10,349,572 | B2 * | 7/2019 | Yamashita | G08G 1/09 |
| 11,035,684 | B2 | 6/2021 | Zhou et al. | |
| 11,700,989 | B2 | 7/2023 | Sim | |
| 2014/0324267 | A1 | 10/2014 | Pfaff et al. | |
| 2020/0009734 | A1 | 1/2020 | Kim | |
| 2021/0114218 | A1 | 4/2021 | Kim et al. | |
| 2022/0074762 | A1 | 3/2022 | Artes et al. | |

FOREIGN PATENT DOCUMENTS

| | | |
|---|---|---|
| KR | 10-2009-0126414 A | 12/2009 |
| KR | 10-2013-0018921 A | 2/2013 |
| KR | 10-2013-0045289 A | 5/2013 |
| KR | 10-1413475 B1 | 7/2014 |
| KR | 10-1620290 B1 | 5/2016 |
| KR | 10-2017-0140561 A | 12/2017 |
| KR | 10-1868695 B1 | 7/2018 |
| KR | 10-2019-0019897 A | 2/2019 |
| KR | 10-2019-0109332 A | 9/2019 |
| KR | 10-2021-0007474 A | 1/2021 |
| KR | 10-2021-0045022 A | 4/2021 |
| WO | 2020/041817 A1 | 3/2020 |

OTHER PUBLICATIONS

International Search Report (PCT/ISA/210) issued on Nov. 2, 2022 by the International Searching Authority in International Patent Application No. PCT/KR2022/010870.

Written Opinion (PCT/ISA/237) issued on Nov. 2, 2022 by the International Searching Authority in International Patent Application No. PCT/KR2022/010870.

Communication issued Sep. 18, 2024 by the European Patent Office in European Patent Application No. 22867553.4.

Communication issued Jul. 15, 2025 by the European Patent Office in European Patent Application No. 22867553.4.

Office Action dated Feb. 25, 2026, issued by Korean Ministry of Intellectual Property in Korean Patent Application No. 10-2021-0120397.

* cited by examiner

510

600

☒ one-way region～610
☒ two-way region～620
☒ obstacles ～630
☐ open region ～640
— peak line ～650

600

| | |
|---|---|
| ▱ | one-way region ∼610 |
| ▨ | two-way region ∼620 |
| ▨ | obstacles ∼630 |
| ▭ | open region ∼640 |
| — | peak line ∼650 |
| — | edge ∼710 |
| ⬤ | node ∼720 |

810  820  830  840

600

R1  R2

R3  R4

850

◻ one-way region ∿610
▨ two-way region ∿620
▧ obstacles ∿630
◻ open region ∿640
— peak line ∿650 one-way region —610
two-way region —620
obstacles —630
open region —640
— peak line —650

ROBOT AND CONTROL METHOD THEREFOR

CROSS-REFERENCE TO RELATED APPLICATIONS

This application is a by-pass continuation application of International Application No. PCT/KR2022/010870, filed on Jul. 25, 2022, which based on and claims priority to Korean Patent Application No. 10-2021-0120397, filed on Sep. 9, 2021, in the Korean Intellectual Property Office, the disclosures of which are incorporated by reference herein in their entireties.

BACKGROUND

1. Field

The disclosure relates to a robot and a control method thereof, and to a robot moving in a space and a control method thereof.

2. Description of Related Art

Recently, developments in technology for robots that are disposed in a space and provide services to users are actively being carried out. Robots that travel a narrow path are able to provide quick service to users by traveling quickly taking into consideration various types of information on a traveling path.

Accordingly, a method of generating a path through which a robot can quickly travel taking into consideration various types of information is needed.

SUMMARY

Provided is a robot that divides a traveling space into a plurality of sub spaces, and generates a minimum time path taking into consideration various types of information for each sub space and a control method thereof.

According to an aspect of the disclosure, a robot includes: at least one sensor; a driver configured to move the robot; a memory configured to store at least one instruction; and a processor operably connected with the at least one sensor, the driver, and the memory, wherein the processor is configured to execute the at least one instruction to: identify sub spaces of a traveling space of the robot, obtain navigability information corresponding to the respective sub spaces based on sensing data obtained by the at least one sensor while the robot is traveling, obtain time information on time required for passing through the respective sub spaces based on a traveling map, the traveling map being obtained based on the navigability information, identify a moving path of the robot based on the time information, and control the driver based on the moving path, wherein the navigability information may include at least one of region information associated with a sub space, information associated with at least one other robot, and information associated with a dynamic object.

The region information associated with the sub space may include at least one of a width corresponding to the sub space, a time required for passing through the sub space, and free space information of the sub space, and the information associated with the dynamic object may include information on a number of dynamic objects.

The information associated with the at least one other robot may include at least one of information on a number of other robots positioned in the sub space, size information of other robots, information on a number of other robots standing by in the sub space, or position information of another robot.

The processor may be further configured to execute the at least one instruction to identify a second other robot scheduled to pass through the sub space as standing by in the sub space based on a sum of widths of first other robots positioned in the sub space being within a threshold range based on a width of the sub space.

The processor may be further configured to execute the at least one instruction to: identify information on a number of robots that can pass through the respective sub spaces based on width information of the respective sub spaces and width information of the robot, and obtain the traveling map including the information on the number of robots that can pass.

The processor may be further configured to execute the at least one instruction to: identify a peak line based on a set of cells in which distance information from the respective sub spaces to an obstacle become a peak, and obtain the traveling map including information corresponding to the peak line.

The processor may be further configured to execute the at least one instruction to obtain width information of the respective sub spaces based on at least one cell vertical with the set of cells in the peak line.

The processor may be further configured to execute the at least one instruction to obtain the traveling map based on at least one of a traversability map in which an obstacle is expanded by a safe margin and a distance map which may include distance information to the obstacle.

According to an aspect of the disclosure, a control method of a robot, includes: identifying sub spaces of a traveling space of the robot; obtaining navigability information corresponding to the respective sub spaces based on sensing data obtained by at least one sensor of the robot while the robot is traveling; obtaining time information on time required for passing through the respective sub spaces based on a traveling map obtained based on the navigability information; identifying a moving path of the robot based on the time information; and controlling a traveling of the robot based on the moving path, wherein the navigability information may include at least one of region information associated with a sub space, information associated with at least one other robot, and information associated with a dynamic object.

The region information associated with the sub space may include at least one of a width corresponding to the sub space, time required for passing through the sub space, and free space information of the sub space, and the information associated with the dynamic object may include information on a number of dynamic objects.

The information associated with the at least one other robot may include at least one of the information on a number of other robots positioned in the sub space, size information of other robots, information on a number of other robots standing by in the sub space, or position information of another robot.

The obtaining navigability information may include identifying a second other robot scheduled to pass through the sub space as standing by in the sub space based on a sum of widths of first other robots positioned in the sub space falling within a threshold range based on a width of the sub space.

The obtaining navigability information may include identifying information on a number of robots that can pass through the respective sub spaces based on width information of the respective sub spaces and width information of the robot.

The obtaining navigability information may include identifying a peak line based on a set of cells in which distance information from the respective sub spaces to an obstacle becomes a peak, and the traveling map may include information corresponding to the peak line.

According to an aspect of the disclosure, a non-transitory computer readable storage medium storing a instructions that are executed by a processor of a robot to perform operations including: identifying sub spaces of a traveling space of the robot; obtaining navigability information corresponding to the respective sub spaces based on sensing data obtained by at least one sensor of the robot while the robot is traveling; obtaining time information on time required for passing through the respective sub spaces based on a traveling map obtained based on the navigability information; identifying a moving path of the robot based on the time information; and controlling a traveling of the robot based on the moving path, wherein the navigability information may include at least one of region information associated with a sub space, information associated with at least one other robot, and information associated with a dynamic object.

According to one or more embodiments, a traveling space may be divided taking into consideration various information included in the traveling space, and a path movable by a robot may be obtained based on characteristics of each divided space. Accordingly, the robot may be able to move with a minimum time.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
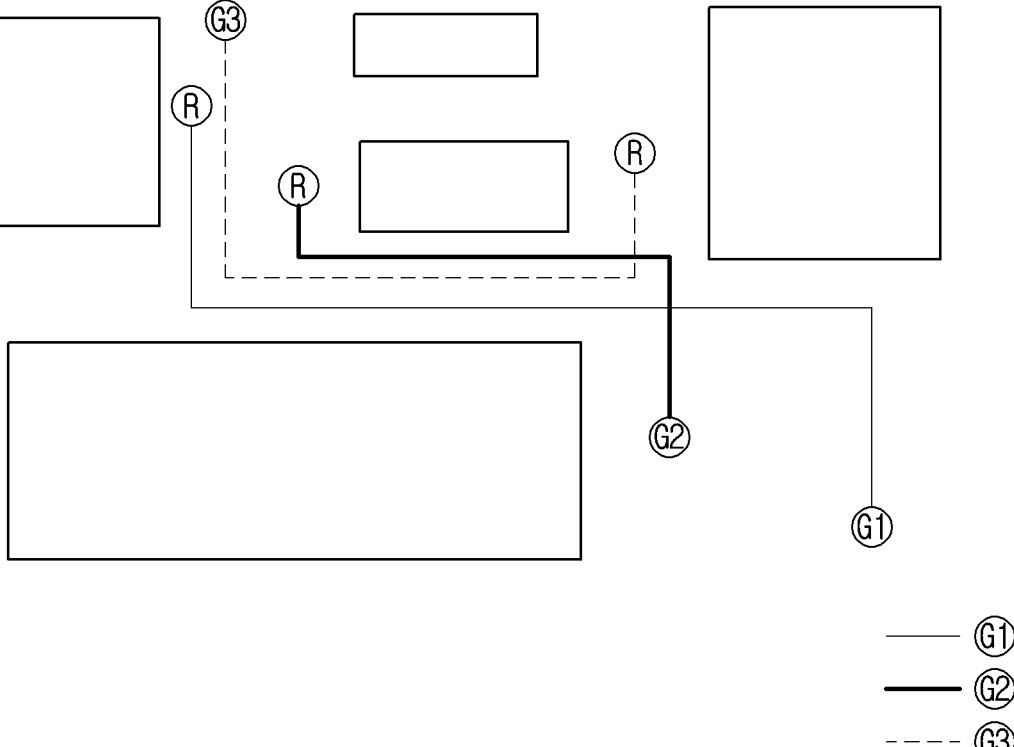
FIG. 1 is a diagram illustrating a path generating method of a robot.

Embodiments of the disclosure will be described in detail below with reference to the accompanying drawings.

Terms used in the disclosure will be briefly described, and the disclosure will be described in detail.

The terms used in describing the embodiments of the disclosure are terms selected that are currently widely used considering their function herein. However, the terms may change depending on intention, legal or technical interpretation, emergence of new technologies, and the like of those skilled in the related art. Further, in some cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

The expression at least one of A and/or B is to be understood as indicating any one of "A" or "B" or "A and B." As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Expressions such as "first," "second," "1st," "2nd," and so on used herein may be used to refer to various elements regardless of order and/or importance. Further, it should be noted that the expressions are used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used herein perform at least one function or operation, and may be implemented with a hardware or software, or implemented with a combination of hardware and software. Further, a plurality of "modules" or a plurality of "parts," except for a "module" or a "part" which needs to be implemented to a hardware, may be integrated to at least one module and implemented in at least one processor.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

In the disclosure, the term 'user' may refer to a person receiving service from a robot, but is not limited thereto.

An embodiment of the disclosure will be described in greater detail below with reference to the accompanied drawings.

FIG. 1 is a diagram illustrating a path generating method of a robot.

Referring to FIG. 1, a robot 100 may provide a service to a user traveling in a space. For example, the robot 100 may provide a service of serving food and the like, but is not limited thereto. The robot 100 may be pre-stored with map information corresponding to a space for traveling in the space, and may travel in the space by performing path generation based therefrom.

According to an example, the robot 100 may generate a minimum time path for reaching a destination based on pre-stored map information. However, if a plurality of robots are traveling and traveling paths of each of the robots overlap (e.g., G1 to G3), a situation of robots running into one another may occur, and in this case, there may be a problem of being stuck without being able to avoid one another.

According to another example, when there is a plurality of robots (e.g., G1 and G2) traveling a narrow passageway, there may be a problem of a robot having to deviate from a pre-set path and take a different path if a width of a different robot (e.g., G3) passing the narrow passageway is not sufficient enough to pass the passageway.

Accordingly, various embodiments of dividing the traveling space into a plurality of sub spaces, and performing the generating of the minimum time path by reflecting various types of information for each sub space will be described below.

Figure 2:
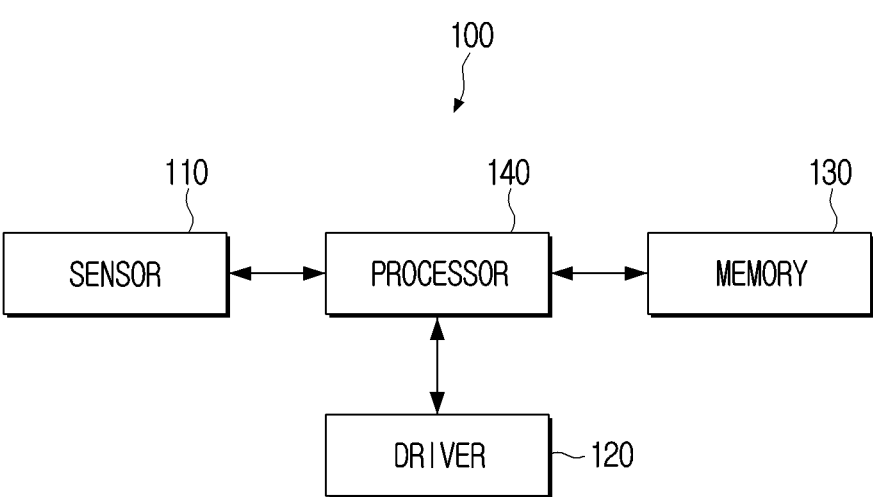
FIG. 2 is a diagram illustrating a configuration of a robot according to an embodiment.

FIG. 2 is a diagram illustrating a configuration of a robot according to an embodiment.

Referring to FIG. 2, the robot 100 may include at least one sensor 110, a driver 120, a memory 130, and a processor 140.

The at least one sensor 110 may include a plurality of sensors of various types. The sensor 110 may measure a physical quantity or detect an operating state of the robot 100, and convert the measured or detected information to an electric signal. The sensor 110 may include a camera, and the camera may include a lens that focuses visible rays and other optical signals received by being reflected by an object to an image sensor and an image sensor capable of sensing the visible rays and other optical signals. Here, the image sensor may include a two-dimensional (2D) pixel array which is divided into a plurality of pixels, and the camera according to an example may be implemented as a depth camera. In addition, the sensor 110 may include a distance sensor such as a light detection and ranging (LiDAR) sensor and a time of fight (ToF) sensor.

In addition thereto, the at least one sensor 110 may include at least one from among a gesture sensor, a gyro sensor, an atmospheric pressure sensor, a magnetic sensor, an acceleration sensor, a grip sensor, a proximity sensor, a color sensor (e.g., red, green, and blue (RGB) sensor), a biometric sensor, a temperature/humidity sensor, an illuminance sensor, or an ultra violet (UV) sensor.

The driver 120 may be a device that provides motive power to move the robot 100. The driver 120 may adjust a traveling direction and a traveling speed according to a control by processor 140, and the driver 120 according to an example may include a power generating device (e.g., a gasoline engine, a diesel engine, a liquefied petroleum gas (LPG) engine, an electric motor, and the like according to a fuel (or an energy source) used) that generates power for the robot 100 to travel, a steering device (e.g., manual steering, hydraulics steering, electronic control power steering (EPS), etc.) for adjusting the traveling direction, a traveling device (e.g., a wheel, a propeller, etc.) that travels the robot 100 according to power, and the like. Here, the driver 120 may be modified and implemented according to a traveling type (e.g., a wheel type, a walking type, a flying type, etc.) of the robot 100.

The memory 130 may store data for one or more embodiments. The memory 130 may be implemented in the form of a memory embedded in the robot 100 according to a data storage use, or in the form of a memory attachable to or detachable from the robot 100. For example, the data for the traveling of the robot 100 may be stored in the memory embedded in the robot 100, and data for an expansion function of the robot 100 may be stored in a memory attachable to or detachable from the robot 100. In one or more embodiments, the memory embedded in the robot 100 may be implemented as at least one from among a volatile memory (e.g., a dynamic random access memory (DRAM), a static RAM (SRAM), a synchronous dynamic RAM (SDRAM) etc.), or a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk travel (HDD) or a solid state travel (SSD)). In addition, the memory attachable to or detachable from the robot 100 may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., universal serial bus (USB) memory) connectable to a USB port, or the like The memory 130 according to an example may store information associated with the traveling space, distance map information, and the like. However, the corresponding information may be received from an external device in real-time. Here, the information associated with the traveling space may be information about an object, that is, a position of an obstacle on the traveling space, a position of other robots, and a position of the user. A distance map may be a form of storing a scale of a straight line to a nearest obstacle for each cell. Here, a cell (or a grid) may be a region of a minimum unit included in a map.

The processor 140 may control the overall operation of the robot 100. Specifically, the processor 140 may control the overall operation of the robot 100 by being connected with each configuration of the robot 100. For example, the processor 140 may control the overall operation of the robot 100 by being electrically connected with the driver 120 and the memory 130.

The processor 140 may perform an operation of the robot 100 according to the various embodiments by executing at least one instruction stored in the memory 130.

The processor 140 according to an embodiment may be designated in various names such as, for example, and without limitation, a digital signal processor (DSP), a microprocessor, a central processing unit (CPU), a micro controller unit (MCU), a micro processing unit (MPU), a neural processing unit (NPU), a controller, an application processor (AP), and the like, but in the disclosure, the above will be described as the processor 140.

The processor 140 may be implemented as a System on Chip (SoC) or a large scale integration (LSI), and may be implemented in the form of a field programmable gate array (FPGA). In addition, the processor 140 may include a volatile memory such as a SRAM.

According to an embodiment, the processor 140 may identify a plurality of sub spaces of the traveling space of the robot 100. Here, the sub space may be divided according to a pre-set standard. For example, it may be a space divided according to a physical structure of the traveling space, but is not limited thereto, and may be divided according to various standards. According to an embodiment, the processor 140 may identify a plurality of sub spaces based on at least one from among a traversability map in which an obstacle is expanded by a safe margin and a distance map which includes distance information to an obstacle.

According to an embodiment, the processor 140 may obtain navigability information corresponding to the respective sub spaces based on sensing data obtained by at least one sensor 110 while the robot 100 is traveling. The navigability information according to an example may include at least one from among region information associated with a sub space, information associated with other robots, or information associated with a dynamic object, but is not limited thereto.

Here, the region information associated with a sub space may include at least one from among a width corresponding to the sub space, time required in passing through the sub space, or free space information of the sub space.

In addition, the information associated with other robots may include at least one from among information on a number of robots positioned in the sub space, size information of each robot, information on a number of other robots standing by in the sub space, or position information of another robot. The processor 140 according to an example may store a look-up table mapped with identification information of a robot including size information of the robot in the memory 130. The processor 140 according to an example may discern a position of the robot 100 by using a global positioning system (GPS), or obtain data about a position of a robot within a traveling space from the outside through a communication interface, and manage the position information of a robot within the traveling space through a robot position managing module. In addition, the processor 140 may manage information on a number of robots or information on a number of other robots standing by in a sub space through the GPS, the communication interface, or the robot position managing module.

In addition, the information associated with a dynamic object may include information on a number of dynamic objects. Here, the object may be an obstacle that impedes in the traveling of the robot 100, and the dynamic object may include, for example, a human, an animal, or the like, but is not limited thereto.

According to an embodiment, the processor 140 may identify information on a number of robots that can pass through corresponding to the respective sub spaces based on width information of the respective sub spaces and width information of a robot, and obtain a traveling map which includes the information on a number of robots that can pass through the respective sub spaces.

The processor 140 according to an example may identify a peak line in the respective sub spaces, and obtain width information of the respective sub spaces based on the peak line. For example, the processor 140 may identify a peak line based on a set of cells in which a distance value from the respective sub spaces to an obstacle becomes a peak. In this case, the processor 140 may obtain width information of the respective sub spaces based on a number of cells included in the peak line and cells which are vertical. Here, the obstacle may be a still object, but is not limited thereto. The still object may include, for example, a wall, a desk, a fixed decoration, and the like, but is not limited thereto.

According to an embodiment, the processor 140 may obtain a traveling map based on at least one from among a traversability map in which an obstacle is expanded by a safe margin and a distance map which includes distance information to an obstacle. According to an example, a traveling map which includes information on a number of robots that can pass through the respective sub spaces may be obtained by calculating a passable width while the obstacle is expanded by a safe margin according to the traversability map. For example, the processor 140 may compare a value in which a size of a width of a passageway corresponding to the plurality of sub spaces and a size of a safe margin are added with a size of a width of the robot 100, and determine a number of robots 100 that can simultaneously travel the traveling space.

According to an embodiment, the processor 140 may identify, based on width information of a sub space being obtained, a second other robot scheduled to pass through the corresponding sub space as a robot standing by in the corresponding sub space based on a sum of the widths of first other robots positioned in the sub space falling within a threshold range based on a width of the sub space. For example, the processor 140 may calculate the sum of the widths of the first other robots positioned in the sub space, and identify the sub space as not travelable by other robots during a threshold time when the sum of the widths of the first other robots falls within the threshold range based on the calculated width of the space. Accordingly, the processor 140 may identify the second other robot scheduled to pass through the corresponding sub space as a robot standing by in the sub space. For example, the processor 140 may identify, based on the second other robot being determined as scheduled to pass through the corresponding sub space based on at least one from among path information or position information of the second other robot, the second other robot as the robot standing by in the sub space. The processor 140 according to an example may receive at least one from among the path information or the position information of the second other robot from one from among the second other robot or a managing server in real-time.

According to an embodiment, the processor 140 may obtain information on time required for passing through the respective sub spaces based on a traveling map obtained according to the above-described embodiments. In this case, the processor 140 may identify a moving path of the robot based on the obtained time required information, and control the driver 120 based on the identified moving path. For example, the processor 140 may identify a path through which a minimum time is required from among a plurality of paths that reach the destination by comparing the time required for passing through the respective sub spaces, but may also identify a minimum distance path, and the above is not limited thereto.

In the above-described embodiment, although an initially identified plurality of sub spaces and a plurality of sub spaces included in the traveling map have been described as the same, the this is for convenience of description, and in one or more embodiments, the initially identified plurality of sub spaces and the plurality of sub spaces included in the traveling map may be partially different. For example, at least a portion of the spaces from among the initially identified plurality of sub spaces may be combined and form one sub space included in the traveling map. Alternatively, in one or more embodiments, one sub space from among the initially identified plurality of sub spaces may be divided into a plurality of sub spaces in the traveling map. That is, the respective sub spaces divided in the traveling map may be determined in various methods based on the navigability information.

In one or more embodiments, the processor 140 may transmit information associated an identified number of robots that can pass to a server or another robot through the communication interface. In this case, the another robot may generate a moving path using the received information on the number of robots.

Figure 3:
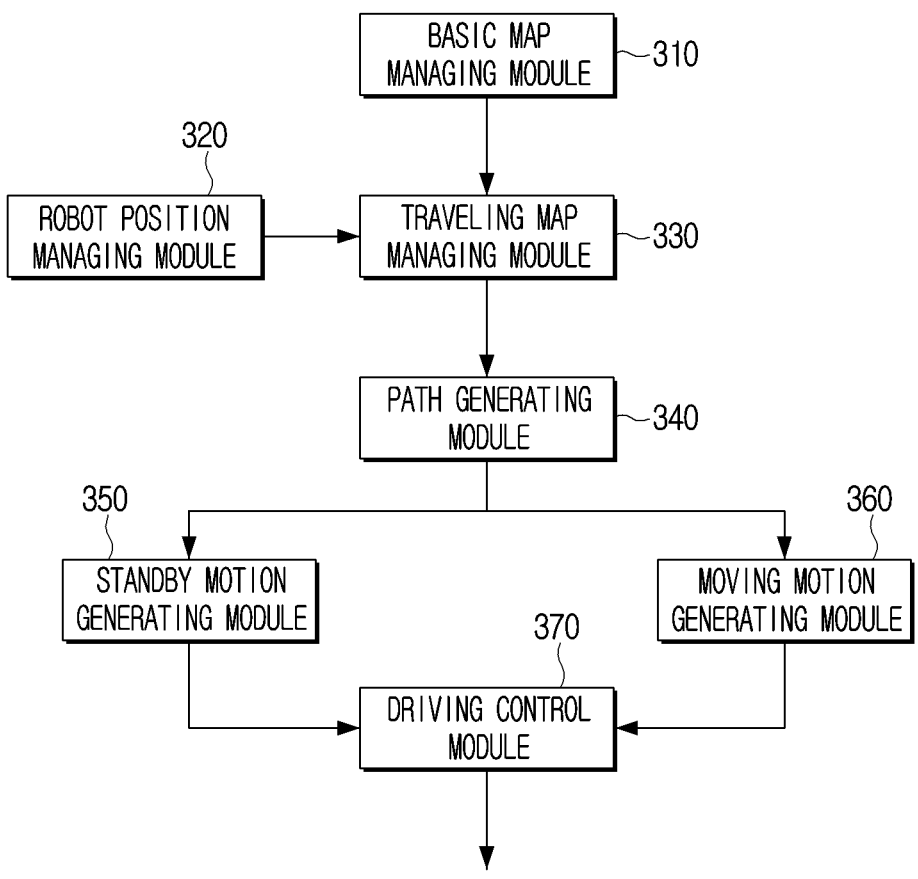
FIG. 3 is a diagram illustrating a moving path and a motion generating method of a robot according to an embodiment.

FIG. 3 is a diagram illustrating a moving path and a motion generating method of a robot according to an embodiment.

Referring to FIG. 3, the processor 140 may manage a basic map of a traveling space (hereinafter, referred to as a basic map) through a basic map managing module 310. The processor 140 may obtain the basic map based on data obtained through the at least one sensor 110 or the communication interface. The processor 140 according to an example may obtain the basic map using various sensors provided in the robot 100 such as, for example, and without limitation, a camera, a LiDAR sensor, an infrared sensor, an ultrasonic sensor, and the like. Here, the basic map may be in a form in which a space is divided into at least one from among an occupied cell, a free cell, or an unknown cell.

In addition, the processor 140 may manage position information of the robot within the traveling space through a robot position managing module 320. The processor 140 according to an example may discern the position of the robot 100 using the GPS, or obtain data about the position of the robot within the traveling space from the outside through the communication interface.

Figure 6:
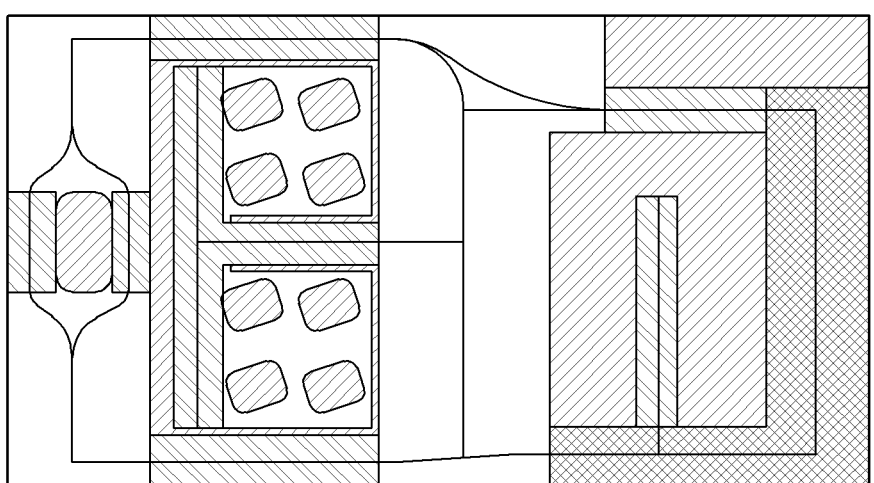
FIG. 6 is a diagram illustrating a traveling map according to an embodiment.

Then, the processor 140 may obtain, based on the obtained basic map and the position information of the robot, the traveling map through a traveling map managing module 330. Here, the traveling map may be in a form as shown in FIG. 6, but is not limited thereto.

Then, the processor 140 may manage, based on the traveling map obtained through the traveling map managing module 330, information about the obtained moving path of the robot through a path generating module 340.

Then, the processor 140 may generate, based on information about the obtained moving path of the robot, a standby motion through a standby motion generating module 350 or generate a moving motion through a moving motion generating module 360. Here, the standby motion may be a control signal which stops a moving of the robot 100 and has the robot 100 to standby at a current position. In addition, the moving motion may be a control signal which maintains the moving of the robot 100 along the moving path. Then, the processor 140 may generate a motion generated through a driving control module 370, that is, a driving signal corresponding to the control signal and transmit to the driver 120.

Figure 4:
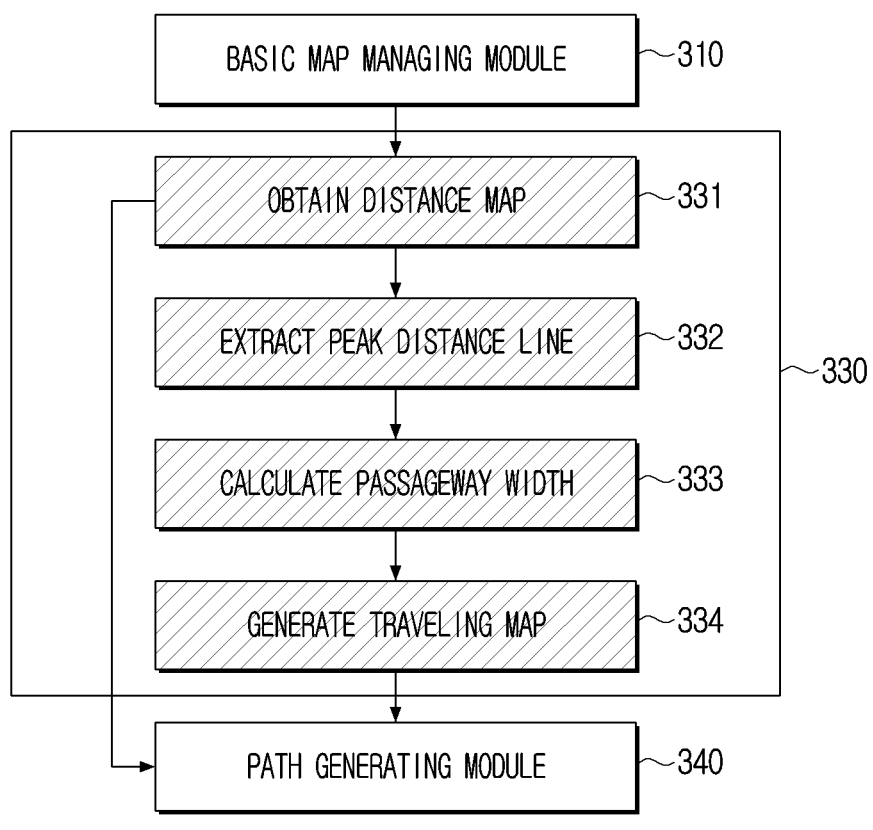
FIG. 4 is a diagram illustrating a traveling map managing module according to an embodiment.

FIG. 4 is a diagram illustrating a traveling map managing module according to an embodiment.

Referring to FIG. 4, the processor 140 may obtain a distance map based on the obtained basic map (331). Here, the distance map may be in a form storing a distance to an obstacle and a probability value of the obstacle, or in a form storing a scale of a straight line distance to an occupied cell which is closest to each cell, but is not limited thereto.

Then, the processor 140 may extract a peak distance line (or, a peak line) based on distance information and the like included in the distance map (332). Here, the peak distance line may be a line formed with a set of cells in which a scale of a straight line distance to an occupied cell stored for each free cell in the distance map becomes a peak.

Then, the processor 140 may calculate a passageway width of a traveling space based on the distance information and the obtained peak distance line included in the distance map (333). At this time, the passageway width may be calculated using the straight line distance from each cell positioned on the peak distance line to the occupied cell, but the above is not limited thereto.

Then, the processor 140 may generate a traveling map based on the distance map and the peak distance line, and the passageway width of the traveling space (334). Then, the processor 140 may generate a moving path of the robot through the path generating module 340 based on the traveling map and the distance map.

Figure 5:
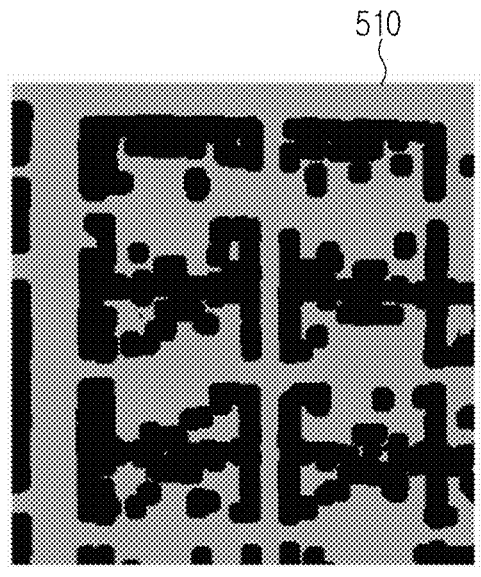
FIG. 5 is a diagram illustrating a basic map according to an embodiment.

FIG. 5 is a diagram illustrating a basic map according to an embodiment.

Referring to FIG. 5, a basic map 510 may be in a form in which a traveling space is divided into at least one from among an occupied cell, a free cell, or an unknown cell. In an example, the occupied cell may be a still object in a traveling space, and the free cell may be a space in which a still object is not positioned in the traveling space. The still object according to an example may be a pillar, a table, a chair, a wall, and the like in the traveling space, but is not limited thereto.

FIG. 6 is a diagram illustrating a form of a traveling map according to an embodiment.

Referring to FIG. 6, a traveling map 600 may include sub space information divided into information on peak distance lines 650 and a number of robots that can pass. For example, the sub space information may be divided into a one-way region 610 through which only one robot may pass, a two-way region 620 through which two robots may pass, obstacles 630 which are spaces corresponding to occupied cells, an open region 640 through which at least three robots may pass.

Figure 7:
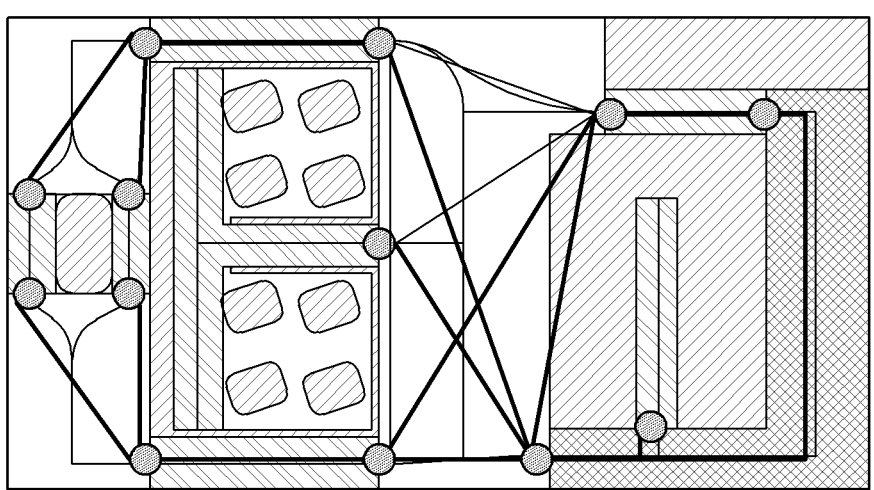
FIG. 7 is a diagram illustrating navigability information and a storing method thereof according to an embodiment.

FIG. 7 is a diagram illustrating navigability information and a storing method thereof according to an embodiment.

Referring to FIG. 7, the processor 140 may store navigability information as a graph model in the memory 130. Here, the graph model may refer to a data structure which collected nodes and edges connecting the nodes in one, and may be typically used when a relationship between the objects that are connected are represented. According to an example, navigability information corresponding to the respective sub spaces may be schematized as a graph model based on the obtained traveling map, and navigability information corresponding to each sub space may be stored in each node. In this case, the edge may represent a connectivity between each node. For example, the edge may be for representing adjacency when two random sub spaces are adjacent.

According to an example, time required between each sub space, that is, time required between the nodes may be calculated based on Equation 1 as shown below.

$$t_{edge} = \left( (n_{queue} + 1) + \frac{\alpha}{w_{region}} + \beta \times n_{D,O} \right) \times t_{region} \qquad \text{[Equation 1]}$$

$t_{edge}$ may refer to a time spent passing through a sub space, and $n_{queue}$ may refer to a number of robots standing by in a space. A and $\beta$ may be parameters for a complexity of a sub space. Here, $\alpha$ and $\beta$ may have a value between 0 and 1.

According to an example, in case of a restaurant with many users, a value of $\beta$ may be greater than a value of $\alpha$, and case of a restaurant with few users, the value of $\alpha$ may be greater than a value of $\beta$, but is not limited thereto. $w_{region}$ may refer to a width of a corresponding sub space, and $n_{D,O}$ may refer to a number of dynamic objects in the corresponding sub space. $t_{region}$ may refer to time spent passing through the corresponding sub space when not taking into consideration navigability information.

According to Equation 1, $t_{edge}$ may be calculated by reflecting the navigability information to a value of time required for passing through the respective sub spaces $t_{region}$. In this case, $t_{edge}$ may be calculated based on a width corresponding to a sub space, information on a number of other robots standing by in the sub space, and information on a number of dynamic objects.

According to Equation 1, $t_{edge}$ may be increased proportionate to a number of robots standing by in the sub space and a number of dynamic objects in the corresponding sub space, and $t_{edge}$ may be increased inversely proportionate to a size of a width of the sub space.

Figure 8:
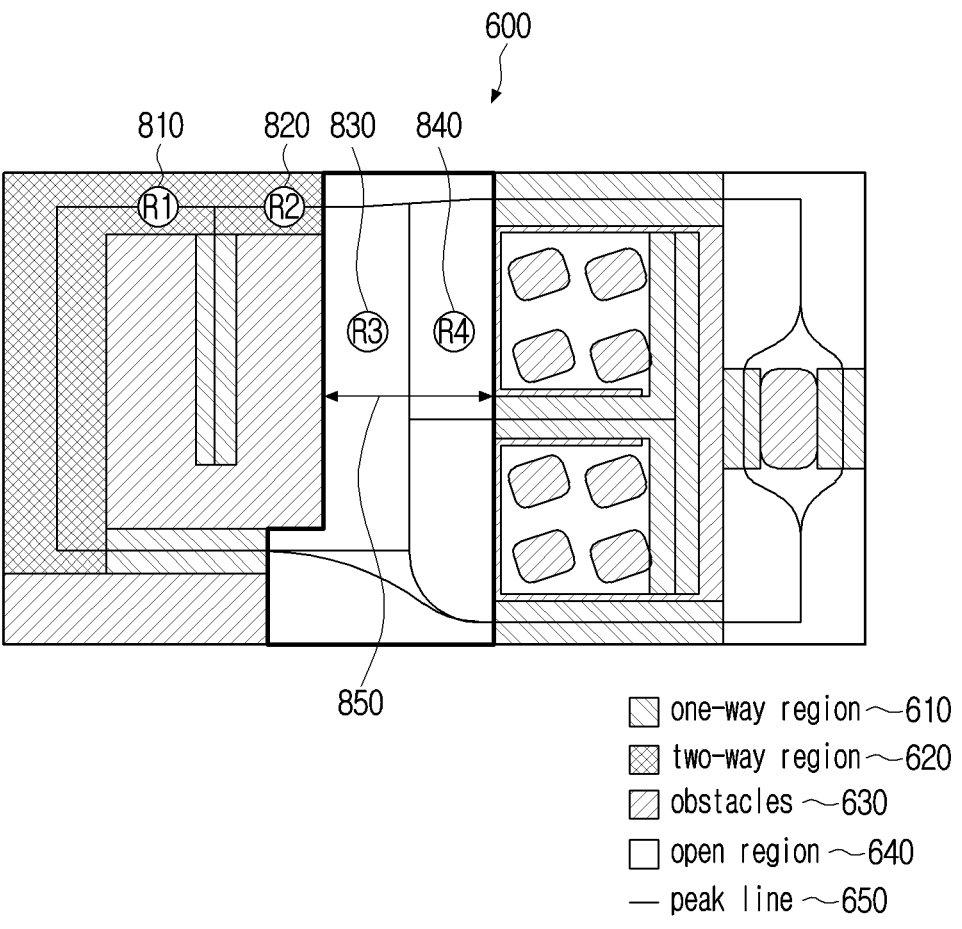
FIG. 8 is a diagram illustrating a method of identifying other robots by a robot according to an embodiment.

FIG. 8 is a diagram illustrating a method of identifying other robots by a robot according to an embodiment.

Referring to FIG. 8, the processor 140 may identify, based on a sum of widths of first other robots 830 and 840 positioned in a sub space falling within a threshold range based on a width of the sub space, a second other robot 820 scheduled to pass through the sub space as a robot standing by in the sub space. For example, when other robots are present on the traveling path of the robot, the processor 140 of a robot 810 corresponding to the robot 100 of FIG. 1 may identify a second other robot 820 scheduled to pass through a first sub space as a robot standing by in the first sub space based on a sum of widths of the first other robots 830 and 840 positioned in the first sub space falling within the threshold range based on a width 850 of the first sub space.

Figure 9:
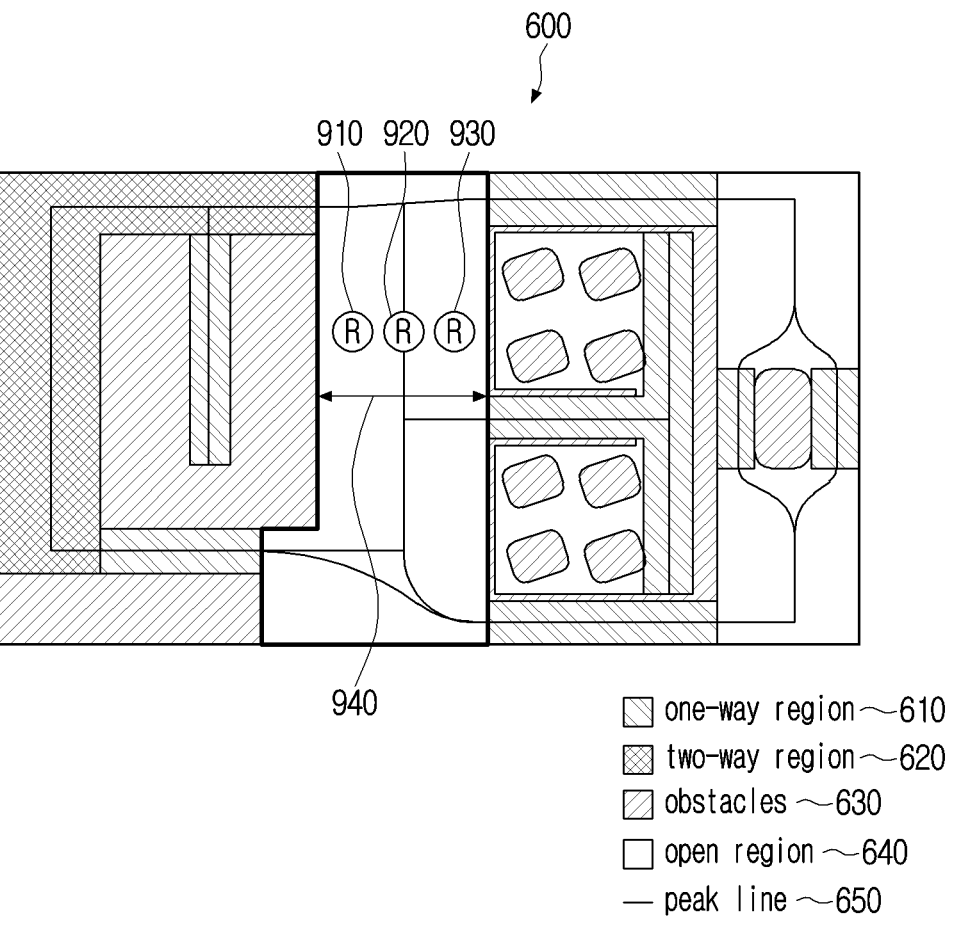
FIG. 9 is a diagram illustrating a method of identifying information on a number of robots that can pass which correspond to a plurality of sub spaces, respectively, according to an embodiment.

FIG. 9 is a diagram illustrating a method of identifying information on a number of robots that can pass which correspond to a plurality of sub spaces, respectively, according to an embodiment.

Referring to FIG. 9, the processor 140 may identify information on a number of robots that can pass corresponding to the respective sub spaces based on width information of the respective sub spaces and width information of the robot 100, and obtain a traveling map including the information on a number of robots that can pass.

Figure 10:
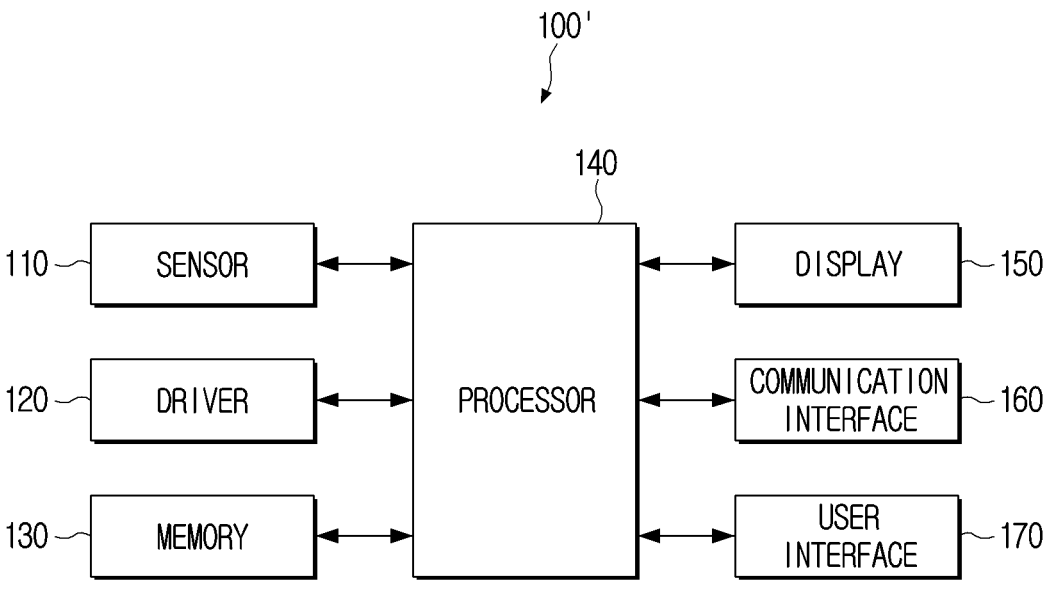
FIG. 10 is a block diagram illustrating a detailed configuration of a robot according to an embodiment.

According to an embodiment, the processor 140 may identify a maximum value of the number of robots that can pass corresponding to a sub space as 3 based on width information 940 of the sub space and width information of other robots 910, 920, and 930, and obtain a traveling map including information on a number of robots that can pass based therefrom. In this case, the processor 140 may obtain width information of robots of various sizes based on pre-obtained information associated with other robots, and accordingly, the maximum value of the number of robots that can pass corresponding to the sub space may be updated while traveling, but is not limited thereto. FIG. 10 is a block diagram illustrating a detailed configuration of a robot according to an embodiment.

According to FIG. 10, the robot 100' may include the least one sensor 110, the driver 120, the memory 130, the processor 140, a display 150, a communication interface 160, and a user interface 170. Detailed descriptions of configurations that overlap with the configurations shown in FIG. 2 from among the configurations shown in FIG. 10 will be omitted.

The display 150 may be implemented as a display including self-emissive devices or as a display including non-emissive devices and a backlight. For example, the display 150 may be implemented as a display of various types such as, for example, and without limitation, a liquid crystal display (LCD), an organic light emitting diode (OLED) display, a light emitting diode (LED), a micro LED, a mini LED, a plasma display panel (PDP), a quantum dot (QD) display, a quantum dot light emitting diodes (QLED), or the like. In the display 150, a driving circuit, which may be implemented in the form of an a-si TFT, a low temperature poly silicon (LTPS) TFT, an organic TFT (OTFT), or the like, a backlight unit, and the like may be included. In one or more embodiments, the display 150 may be implemented as a touch screen coupled with a touch sensor, a flexible display, a rollable display, a three-dimensional display (3D display), a display physically coupled with a plurality of display modules, or the like. In addition, the display 150 may be embedded with a touch screen, and implemented to execute a program using a finger or a pen (e.g., stylus pen).

The communication interface 160 may input and output data of various types. For example, the communication interface 160 may transmit and receive data of various types with an external device (e.g., source device), an external storage medium (e.g., a USB memory), or an external server (e.g., WEBHARD) through communication methods such as, for example, and without limitation, an AP based Wi-Fi (e.g., Wi-Fi, wireless LAN network), Bluetooth, ZigBee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), Optical, Coaxial, or the like.

When map information is received from an external device (or external server) according to an example, map information may be received through the communication interface 160.

The user interface 170 may be a configuration for a robot 100' to perform an interaction with the user. For example, the user interface 170 may include at least one from among a touch sensor, a motion sensor, a button, a jog dial, a switch, a microphone, or a speaker, but is not limited thereto.

Figure 11:
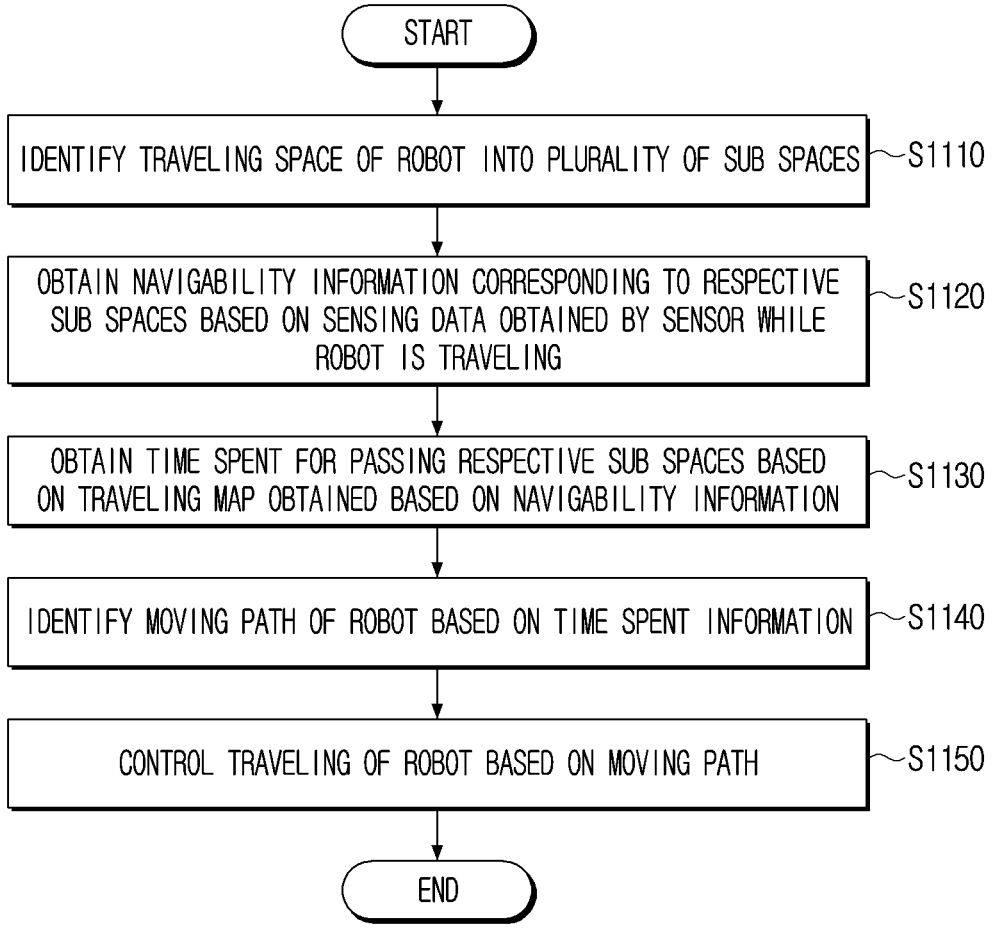
FIG. 11 is a flowchart illustrating a control method of a robot according to an embodiment.

FIG. 11 is a flowchart illustrating a control method of a robot according to an embodiment.

According to the control method of the robot shown in FIG. 11, a plurality of sub spaces of a traveling space of the robot may be identified (S1110)

Then, navigability information corresponding to the respective sub spaces may be obtained based on sensing data obtained by a sensor while the robot is traveling (S1120).

Then, information on time required for passing through the respective sub spaces may be obtained based on the traveling map obtained based on the navigability information (S1130).

Then, a moving path of the robot may be identified based on the obtained time required information (S1140).

Then, a traveling of the robot may be controlled based on the identified moving path (S1150).

In addition, in S1120 of obtaining navigability information, the navigability information may include at least one from among region information associated with a sub space, information associated with other robots, or information associated with a dynamic object.

In addition, in S1120 of obtaining navigability information, the region information associated with a sub space may include at least one from among a width corresponding to the sub space, time required passing through the sub space, or a free space of the sub space, and the information associated with a dynamic object may include information on a number of dynamic objects.

In addition, in S1120 of obtaining navigability information, the information associated with other robots associated with a sub space may include at least one from among information on a number of robots positioned in the sub space, size information of each robot, information on a number of other robots standing by in the sub space, or position information of another robot.

In addition, in S1120 of obtaining navigability information, the second other robot scheduled to pass through the sub space may be identified as a robot standing by in the sub space if the sum of the widths of the first other robots positioned in the sub space falls within the threshold range based on the width of the sub space.

In addition, in S1120 of obtaining navigability information, information on a number of robots that can pass corresponding to the respective sub spaces may be identified based on width information of the respective sub spaces and width information of the robot.

In addition, in S1120 of obtaining navigability information, distance information from the respective sub spaces to the obstacle may include identifying a peak line obtained based on a set of cells that become a peak, and at this time, the traveling map may include information corresponding to the peak line.

In addition, in S1120 of obtaining navigability information, width information of the respective sub spaces may be obtained based on a number of cells vertical with the cells included in the peak line.

In addition, in S1130 of obtaining information on time required, the traveling map may be obtained based on at least one from among the traversability map in which an obstacle is expanded by a safe margin and the distance map which includes distance information to an obstacle.

According to one or more embodiments described above, a minimum time path may be generated by dividing the traveling space into the plurality of sub spaces and taking into consideration various types of information for each sub space.

Methods according to one or more embodiments described above may be implemented in an application form installable in an electronic device of the related art. Alternatively, methods according to one or more embodiments of the disclosure described above may be performed using a deep learning-based artificial neural network (or deep artificial neural network), that is, a learning network model.

In addition, the methods according to one or more embodiments described above may be implemented with only a software upgrade, or a hardware upgrade for the electronic device of the related art.

In addition, one or more embodiments described above may be performed through an embedded server provided in the electronic device, or an external server of the electronic device.

One or more embodiments described above may be implemented with software including instructions stored in a machine-readable storage media (e.g., computer). The machine may call a stored instruction from the storage medium, and as a device operable according to the called instruction, may include an electronic device (e.g., electronic device (A)) according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' is that the storage medium is tangible and does not include a signal, and the term does not differentiate data being semi-permanently stored or being temporarily stored in the storage medium.

In addition, according to an embodiment, a method according to one or more embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily generated.

In addition, each of the elements (e.g., a module or a program) according to one or more embodiments described above may be formed as a single entity or a plurality of entities, and some sub-elements of the above-mentioned sub-elements may be omitted, or other sub-elements may be further included in one or more embodiments. In one or more embodiments or additionally, some elements (e.g., modules or programs) may be integrated into one entity to perform the same or similar functions performed by the respective elements prior to integration. Operations performed by a module, a program, or another element, in accordance with one or more embodiments, may be executed sequentially, in a parallel, repetitively, or in a heuristic manner, or at least some operations may be executed in a different order, omitted or a different operation may be added.

While example embodiments have been illustrated and described, it will be understood that the disclosure is intended to be illustrative, not limiting. It will be understood by those skilled in the art that various changes in form and details may be made therein without departing from the true spirit and full scope of the disclosure, including the appended claims and their equivalents.

What is claimed is:

1. A robot comprising:

at least one sensor;

a driver configured to move the robot;

a memory configured to store at least one instruction; and a processor operably connected with the at least one sensor, the driver, and the memory, wherein the processor is configured to execute the at least one instruction to:

identify sub spaces of a traveling space of the robot, obtain navigability information corresponding to the respective sub spaces based on sensing data obtained by the at least one sensor while the robot is traveling, identify information on a number of robots that can pass through the respective sub spaces based on width information of the respective sub spaces and width information of the robot, obtain a traveling map based on the navigability information, the traveling map comprising the information on the number of robots that can pass through the respective sob spaces, obtain time information on a time required for passing through the respective sub spaces based on the traveling map, identify a moving path of the robot based on the time information, and control the driver based on the moving path, wherein the navigability information comprises at least one of region information associated with a sub space, information associated with at least one other robot, and information associated with a dynamic object.

2. The robot of claim 1, wherein the region information associated with the sub space comprises at least one of a width corresponding to the sub space, a time required for passing through the sub space, and free space information of the sub space, and wherein the information associated with the dynamic object comprises information on a number of dynamic objects.

3. The robot of claim 1, wherein the information associated with the at least one other robot comprises at least one of information on a number of other robots positioned in the sub space, size information of other robots, information on a number of other robots standing by in the sub space, or position information of another robot.

4. The robot of claim 1, wherein the processor is further configured to execute the at least one instruction to identify a second other robot scheduled to pass through the sub space as standing by in the sub space based on a sum of widths of first other robots positioned in the sub space being within a threshold range based on a width of the sub space.

5. The robot of claim 1, wherein the processor is further configured to execute the at least one instruction to:

identify a peak line based on a set of cells in which distance information from the respective sub spaces to an obstacle become a peak, and obtain the traveling map comprising information corresponding to the peak line.

6. The robot of claim 5, wherein the processor is further configured to execute the at least one instruction to obtain the width information of the respective sub spaces based on at least one cell vertical with the set of cells in the peak line.

7. The robot of claim 1, wherein the processor is further configured to execute the at least one instruction to obtain the traveling map based on at least one of a traversability map in which an obstacle is expanded by a safe margin and a distance map which comprises distance information to the obstacle.

8. A control method of a robot, the control method comprising:

identifying sub spaces of a traveling space of the robot;

obtaining navigability information corresponding to the respective sub spaces based on sensing data obtained by at least one sensor of the robot while the robot is traveling;

identifying information on a number of robots that can pass through the respective sub spaces based on width information of the respective sub spaces and width information of the robot;

obtaining a traveling map based on the navigability information, the traveling map comprising the information on the number of robots that can pass through the respective sub spaces;

obtaining time information on a time required for passing through the respective sub spaces based the traveling map;

identifying a moving path of the robot based on the time information; and controlling a traveling of the robot based on the moving path, wherein the navigability information comprises at least one of region information associated with a sub space, information associated with at least one other robot, and information associated with a dynamic object.

9. The control method of claim 8, wherein the region information associated with the sub space comprises at least one of a width corresponding to the sub space, a time required for passing through the sub space, and free space information of the sub space, and wherein the information associated with the dynamic object comprises information on a number of dynamic objects.

10. The control method of claim 8, wherein the information associated with the at least one other robot comprises at least one of the information on a number of other robots positioned in the sub space, size information of other robots, information on a number of other robots standing by in the sub space, or position information of another robot.

11. The control method of claim 8, wherein the obtaining navigability information comprises identifying a second other robot scheduled to pass through the sub space as standing by in the sub space based on a sum of widths of first other robots positioned in the sub space falling within a threshold range based on a width of the sub space.

12. The control method of claim 8, wherein the obtaining navigability information comprises identifying a peak line based on a set of cells in which distance information from the respective sub spaces to an obstacle becomes a peak, and wherein the traveling map comprises information corresponding to the peak line.

13. A non-transitory computer readable storage medium storing a instructions that are executed by a processor of a robot to perform operations comprising:

identifying sub spaces of a traveling space of the robot;

obtaining navigability information corresponding to the respective sub spaces based on sensing data obtained by at least one sensor of the robot while the robot is traveling;

identifying information on a number of robots that can pass through the respective sub spaces based on width information of the respective sub spaces and width information of the robot;

obtaining a traveling man based on the navigability infor-
mation, the traveling man comprising the information
on the number of robots that can pass through the
respective sob spaces, obtaining time information on a time required for passing
through the respective sub spaces based on the travel-
ing map;

identifying a moving path of the robot based on the time
information; and controlling a traveling of the robot based on the moving
path, wherein the navigability information comprises at least
one of region information associated with a sub space,
information associated with at least one other robot,
and information associated with a dynamic object.

* * * * *